April 11, 1967   C. H. POTTS   3,313,092
APPARATUS FOR FRACTIONATING GASEOUS MIXTURES
Filed May 5, 1964
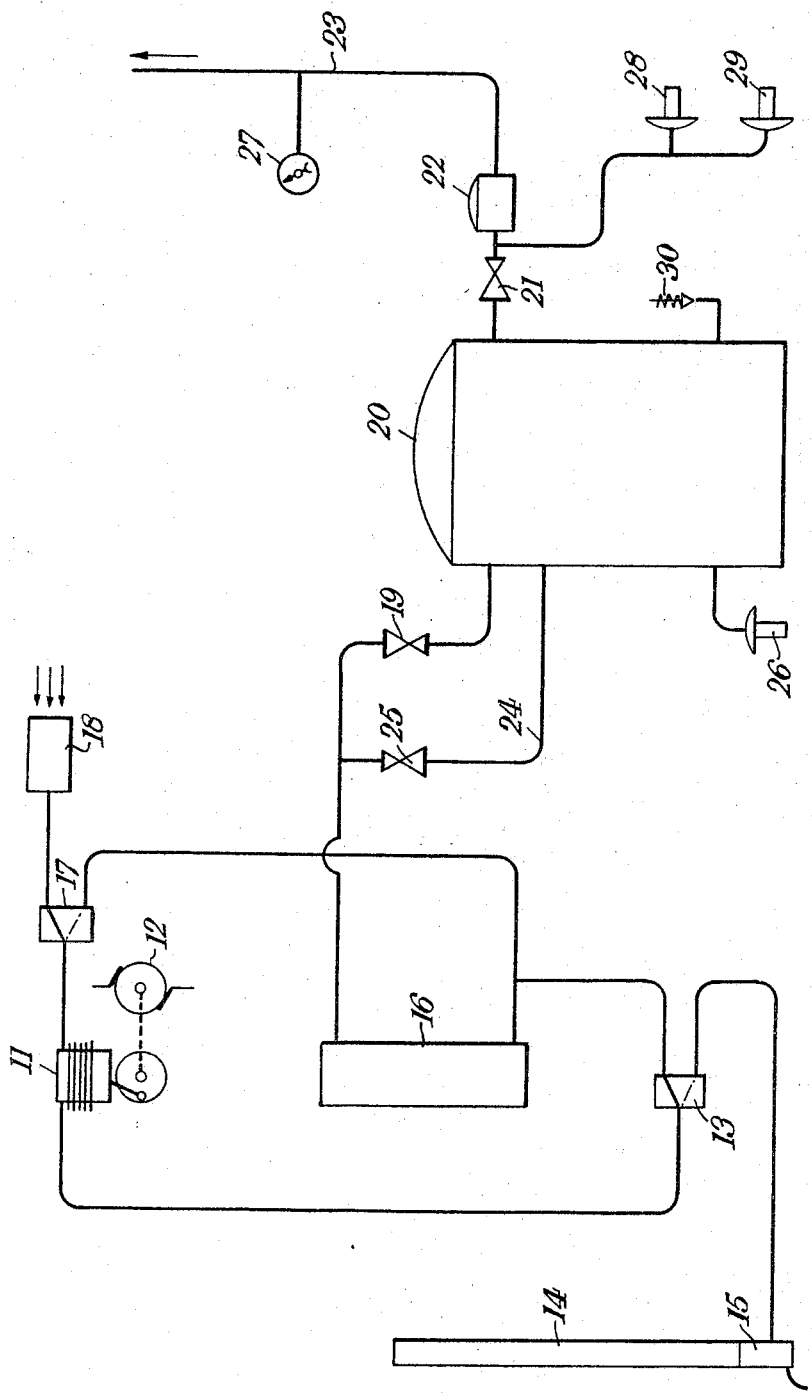

United States Patent Office 3,313,092
Patented Apr. 11, 1967

3,313,092
APPARATUS FOR FRACTIONATING
GASEOUS MIXTURES
Charles Henry Potts, West Ewell, Surrey, England, assignor to Dryvent Limited, London, England, a British company
Filed May 5, 1964, Ser. No. 365,060
Claims priority, application Great Britain, May 17, 1963, 19,806/63
4 Claims. (Cl. 55—163)

The present invention relates to an apparatus for fractionating gaseous mixtures and is particularly though not exclusively concerned with the drying of air.

It has hitherto been proposed to employ air drying apparatus in which the air to be dried is passed through one drying element for a predetermined time whilst another drying element is being re-activated and then to switch over the apparatus so that the air passes through the re-activated element whilst the element previously employed for drying is subjected to a re-activating treatment. In one specific arrangement, air is passed under pressure through one drying element and a portion of the pressurized dried air is fed back through an expansion valve to the element to be re-activated so that it serves to pick up moisture in the latter element and pass it to atmosphere. After a predetermined time the apparatus is switched over so that pressurised air is dried in the re-activated element and a portion of the dried pressurised air therefrom is fed back through the expansion valve to the other element from which it passes to atmosphere.

It has been found that in the arrangement above described it is necessary to operate the apparatus at a relatively high air pressure so as to produce by expansion of the feedback air the required conditions for drying the element to be re-activated and it is an object of the present invention to provide an apparatus for drying air under relatively low pressures.

According to the present invention, there is provided a method of fractionating a gaseous mixture comprising the steps of applying said gaseous mixture under pressure to an adsorbent element to produce therefrom a primary product, feeding back a portion of said primary product to said element at a time when the supply of gaseous mixture to the element is cut off or to a further adsorbent element at a time when the latter is not in use, and withdrawing from said element or said further element the feedback portion of said primary product under a pressure less than atmospheric pressure.

Further, according to the present invention, there is provided a method of fractionating a gaseous mixture comprising the steps of applying said gaseous mixture under pressure to an adsorbent element to produce therefrom a primary product, whilst storing a portion of said primary product so that the same is available for withdrawal through the said element, by the application thereto of a partial vacuum, at a time when the supply of gaseous mixture to the element is cut off or through a further adsorbent element at a time when the latter is not in use, and withdrawing from said element or said further element the feedback portion of said primary product under a pressure less than atmospheric pressure.

Further according to the present invention, there is provided apparatus for fractionating a gaseous mixture comprising an adsorbent element, means for supplying said gaseous mixture under pressure to said element to produce therefrom a primary product, means for feeding back to said element a feedback portion of the primary product at a time when the supply of gaseous mixture to the element is cut off and means for withdrawing said feedback portion of the primary product from the element under a pressure less than atmospheric pressure.

Preferably, one adsorbent element is employed and a storage tank is provided for storing a portion of the primary product, and the method includes feeding back a portion of said stored primary product to the element at a time when the supply of gaseous mixture to the element is cut off. Conveniently, a valve is provided which in one condition connects the element to a supply of pressurised gaseous mixture and in another condition connects the element to an outlet subjected to a reduced pressure less than atmospheric pressure. In addition, an arrangement of valves is provided for regulating the flow of primary product to and from the tank as well as the flow of the feedback portion of the stored primary product, and the arrangement is such that when the valve is connected to supply said gaseous mixture under pressure to the element, the feedback path for said feedback portion of the stored primary product is cut off and the primary product is accumulated in said tank up to a predetermined pressure, and when the valve is switched over to apply suction to the element, the pressure differentials in the feedback path is such as to permit a flow of the feedback portion through said path and to the element and through the latter to the suction outlet.

One embodiment of the invention will now be described by way of example with reference to the accompanying drawing which is a flow diagram of pressurisation apparatus according to the invention.

Referring to the drawing, the apparatus illustrated is provided for continuously supplying pressurised dry air for the pressurisation of electronic equipment such as aerials and wave guides. The apparatus comprises an oil-free carbon-ring compressor 11 which is driven by a capacitor start single phase motor 12, the pressure side of the compressor 11 being connected to the inlet to a solenoid-operated valve 13 having two alternative outlets, one of which is connected to an outlet silencer 14 and a drain 15 and the other of which is connected to the inlet to an absorber vessel 16 containing a graded desiccant such as silica gel or activated alumina, and the suction side of the compressor 11 being connected to an outlet of a further solenoid-operated valve 17 having two alternative inlets, one of which is connected to an air intake filter and silencer 18 and the other of which is connected to the inlet to the adsorber vessel 16.

The solenoid-operated valves 13 and 17 are controlled by energising current from a circuit hereinafter referred to and the arrangement is such that the valves are operated in synchronism whereby in one condition the suction side of the compressor 11 is connected to atmosphere through the air intake filter and silencer 18 and the pressure side of the compressor 11 is connected to the inlet to the adsorber vessel 16, and in the other condition the suction side of the compressor 11 is connected to the inlet to the adsorber vessel 16 and the pressure side of the compressor 11 is connected to the outlet silencer 14 and drain 15.

The adsorber vessel 16 is provided with an outlet connected via a pressure-maintaining valve 19 to a dry-air storage tank 20 which is provided with an outlet connected via a pressure-reducing valve 21 and a diaphragm-operated sensitive relief valve 22 to an outlet connection 23 which is, in operation, coupled to the equipment to be pressurised.

A feedback connection 24 is provided between storage tank 20 and the outlet of the adsorber vessel 16 and includes a pressure control valve 25 which prevents any flow of air in the feedback path in the tank direction but which under appropriate conditions allows air to be fed back from the tank 20 and to undergo a predetermined expansion before entry to the vessel 16. A cycle pressure switch 26 which is connected to the tank 20 controls the flow of current in the energising circuit for the solenoid-operated valves 13 and 17.

In operation, the valves 13 and 17 are initially set in a condition in which pressurised air from the compressor 11 is supplied to the inlet to the adsorber vessel 16 and a reservoir of pressurised dry air is built up in the storage tank 20 making available a continuous supply of dry air at the output connection 23. After a time, the cycle pressure switch 26 operates, causing the valves 13 and 17 to switch over so as to connect the suction side of the compressor 11 to the inlet to the adsorber vessel 16 and the pressure side to the outlet silencer 14, as a result of which the pressure at the output of the adsorber vessel 16 falls and air from the storage tank 20 is fed back through the feedback path 24 where it expands on passing through the valve 25. The expanded dry air passes into the adsorber vessel 16 which is re-activated thereby, and is withdrawn from the vessel by the compressor 11 which pumps it to atmosphere. The switching cycle for the valves 13 and 17 is determined by the size of the storage tank 20 and the rate at which the adsorber vessel loses its moisture adsorbing capacity.

It will be appreciated that by arranging for the feedback portion of the dried air to be withdrawn from the adsorber vessel under suction conditions the need for maintaining a high pressure level in the apparatus is avoided, and it has been found that the output air when using apparatus according to the invention is much drier than that obtained when using previously proposed arrangements working at the same pressure level.

As illustrated, a pressure gauge 27 is coupled to the outlet connection 23 to indicate the pressure existing in the aerial or wave guide system being pressurised. In addition, alarms 28 and 29 are provided which respond to pressures in the outlet connection exceeding and falling below predetermined levels. A relief valve 30 is also provided for relieving any excessive pressure developed in the storage tank 20.

The apparatus hereinbefore described with reference to the drawing is particularly suitable for pressurising aerials and waveguides. In another application, namely the pressurisation of cables, the apparatus is required to keep a fairly gas-tight enclosure pressurised. In the latter application the apparatus need not include a storage tank of its own, but may make use of the enclosure as a storage tank.

What I claim as my invention and desire to secure by Letters Patent is:

1. Apparatus for fractionating a gaseous mixture comprising an adsorbent element, means for supplying said gaseous mixture under pressure to said element to produce therefrom a primary product, means for storing a portion of the primary product so that the same is available for withdrawal through said element as a feedback portion, means for feeding back to said element a feedback portion of the primary product at a time when the supply of gaseous mixture to the element is cut off, and means for withdrawing said feedback portion of the primary product from the element under pressure less than atmospheric pressure, said means for supplying the said gaseous mixture under pressure to said element and the means for withdrawing the feedback portion of the primary product from the element comprises a compressor having a pressure port for supplying said gaseous mixture under pressure and a suction port for producing a pressure less than atmospheric pressure, and a valve arrangement which in one condition connects the pressure port of the compressor to an inlet to the adsorbent element and the suction port of the compressor to atmosphere and in another conditon connects the pressure port of the compressor to atmosphere and the suction port of the compressor to the inlet to the adsorbent element.

2. Apparatus according to claim 1, wherein the valve arrangement is electrically operated and controlled by an electrical switch, and wherein said switch is responsive to pressure changes in the primary product stored in said storage means.

3. Apparatus according to claim 2, wherein said means for feeding back to said element a feedback portion of the primary product comprises a control valve connected in a feedback path between the storage means and the adsorbent element, said control valve being such as to permit the flow of said feedback portion through said path to the adsorbent element when suction is applied to the element by the compressor but prevents the flow of primary product from the adsorbent element to said storage means through said feedback path when pressurised primary product is fed to the adsorbent element by the compressor.

4. Apparatus according to claim 3, wherein said storage means comprises a storage tank provided with an outlet including a pressure reducing valve for maintaining a continuous supply of primary product at constant pressure.

References Cited by the Examiner
UNITED STATES PATENTS 3,141,748  7/1964  Hoke et al. _____ 55—62 X
3,182,435  5/1965  Axt _____ 55—33 X REUBEN FRIEDMAN, *Primary Examiner.*

J. W. ADEE, *Assistant Examiner.*